US012761510B2

(12) United States Patent
Li et al.

(10) Patent No.: US 12,761,510 B2
(45) Date of Patent: Oct. 13, 2026

(54) FLEXIBLE ARRAY SUBSTRATE AND FLEXIBLE DISPLAY PANEL

(71) Applicant: HKC CORPORATION LIMITED, Shenzhen (CN)

(72) Inventors: Yao Li, Shenzhen (CN); Zhonglin Cao, Shenzhen (CN); Chuan Wu, Shenzhen (CN); Tien-Chun Huang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 163 days.

(21) Appl. No.: 18/937,046

(22) Filed: Nov. 5, 2024

(65) Prior Publication Data

US 2025/0147352 A1 May 8, 2025

(30) Foreign Application Priority Data

Nov. 7, 2023 (CN) ......................... 202311467584.9

(51) Int. Cl.
*G02F 1/1333* (2006.01)
*G02F 1/1335* (2006.01)
*G02F 1/1343* (2006.01)

(52) U.S. Cl.
CPC .. *G02F 1/133305* (2013.01); *G02F 1/133377* (2013.01); *G02F 1/133553* (2013.01); *G02F 1/13439* (2013.01); *G02F 2201/501* (2013.01)

(58) Field of Classification Search
CPC ......... G02F 1/133305; G02F 1/133377; G02F 1/133553; G02F 1/13439; G02F 2201/501; G02F 1/167; G02F 1/1677
See application file for complete search history.

(56) References Cited

U.S. PATENT DOCUMENTS 11,348,983 B1 5/2022 Choung et al.
11,552,143 B1 1/2023 Choung et al.
(Continued)

FOREIGN PATENT DOCUMENTS

CN 108152999 A 6/2018
CN 108461531 A 8/2018
(Continued)

OTHER PUBLICATIONS

Chinese First Office Action, Chinese Application No. 202311467584.9, mailed Dec. 15, 2023 (10 pages).
(Continued)

*Primary Examiner* — Kevin Quarterman

(57) ABSTRACT

A flexible array substrate and a flexible display panel are provided. The flexible array substrate includes a plurality of pixel island areas sequentially arranged, a plurality of flexible areas, and a plurality of isolation structures. Each of the plurality of flexible areas is disposed between adjacent two of the plurality of pixel island areas. Each of the plurality of isolation structures covers a corresponding one of the plurality of flexible areas, edges of each of the plurality of isolation structures extend out of the corresponding one of the plurality of flexible areas, and an upper surface of each of the plurality of isolation structures defines a groove. Each of the plurality of flexible areas includes an elastic packaging part disposed in the groove and including a light reflective material body. The light reflective material body is configured for pixel compensation.

20 Claims, 6 Drawing Sheets

(56) References Cited

U.S. PATENT DOCUMENTS

| | | | | |
|---|---|---|---|---|
| 11,626,569 | B1 | 4/2023 | Lee et al. | |
| 2021/0134196 | A1* | 5/2021 | Niu | G09G 3/006 |
| 2021/0135154 | A1* | 5/2021 | Liu | H10K 59/1201 |
| 2022/0123099 | A1 | 4/2022 | Jia et al. | |
| 2023/0075199 | A1* | 3/2023 | Tian | H10K 50/844 |

FOREIGN PATENT DOCUMENTS

| | | | |
|---|---|---|---|
| CN | 109656077 | A | 4/2019 |
| CN | 108461531 | B | 9/2019 |
| CN | 110224077 | A | 9/2019 |
| CN | 110047380 | B | 6/2020 |
| CN | 111326607 | B | 5/2021 |
| CN | 112928149 | A | 6/2021 |
| CN | 110164364 | B | 8/2021 |
| CN | 113328049 | A | 8/2021 |
| CN | 113778261 | A | 12/2021 |
| CN | 113971905 | A | 1/2022 |
| CN | 110045824 | B | 6/2022 |
| CN | 111462637 | B | 7/2022 |
| CN | 113471237 | B | 9/2022 |
| CN | 115020445 | A | 9/2022 |
| CN | 112736093 | B | 10/2022 |
| CN | 112530864 | B | 11/2022 |
| CN | 115274696 | A | 11/2022 |
| CN | 112134979 | B | 4/2023 |
| CN | 112198707 | B | 4/2023 |
| CN | 113035056 | B | 4/2023 |
| CN | 115918295 | A | 4/2023 |
| CN | 116322179 | A | 6/2023 |
| CN | 116382523 | A | 7/2023 |
| CN | 116469314 | A | 7/2023 |
| KR | 20200067524 | A | 6/2020 |
| WO | 2022051004 | A1 | 3/2022 |

OTHER PUBLICATIONS

Chinese Notification to Grant Patent Right for Invention, Chinese Application No. 202311467584.9, mailed Jan. 6, 2024 (5 pages).

* cited by examiner

FLEXIBLE ARRAY SUBSTRATE AND FLEXIBLE DISPLAY PANEL

CROSS-REFERENCE TO RELATED APPLICATIONS

The present application claims priority to Chinese Patent Application No. 202311467584.9, filed Nov. 7, 2023, which is herein incorporated by reference in its entirety.

TECHNICAL FIELD

The present disclosure relates to the field of display technologies, and in particular to a flexible array substrate and a flexible display panel.

BACKGROUND

Flexible display panels, as a new form of flexible and stretchable products, have attracted widespread attention from consumers, because their variable display size may be applied in multiple practical scenarios. Usually, a light-emitting layer of an organic light emitting diode (OLED) is composed of thin films with RGB three light-emitting colors. In the process of preparing the light-emitting films with three colors, it is necessary to use a substrate's barrier (isolation column) for printing patterning technology. In recent years, based on display technologies such as OLED, LCD (liquid crystal display), Min LED, or the like, and by forming components such as display pixel units, connecting wires, light-emitting units and the like on a flexible substrate made of organic materials, a flexible display panel that may stretch/contract in specific directions and change to a fixed shape is formed.

For stretchable display products, the existing flexible display panel increases distances between pixels in the display area and decreases resolution when stretched, resulting in an increase in the graininess of the displayed image of the stretched flexible display panel and a decrease in the user experience.

SUMMARY OF THE DISCLOSURE

A technical solution in the present disclosure is to provide a flexible array substrate. The flexible array substrate includes a plurality of pixel island areas, a plurality of flexible areas, and a plurality of isolation structures. The plurality of pixel island areas are sequentially arranged. Each of the plurality of flexible areas is disposed between adjacent two of the plurality of pixel island areas.

Each of the plurality of isolation structures covers a corresponding one of the plurality of flexible areas, edges of each of the plurality of isolation structures extend out of the corresponding one of the plurality of flexible areas, and an upper surface of each of the plurality of isolation structures defines a groove.

Each of the plurality of flexible areas includes an elastic packaging part.

The elastic packaging part is disposed in the groove and includes a light reflective material body.

The light reflective material body is configured for pixel compensation.

In some embodiments, each of the plurality of pixel island areas includes a driving substrate, a pixel definition layer, and a plurality of sub-pixels.

The pixel definition layer is disposed on the driving substrate, the pixel definition layer protrudes from the driving substrate to form a pixel accommodation area.

The plurality of sub-pixels are disposed in the pixel accommodation area, each of the plurality of sub-pixels includes an anode, a light-emitting layer, and a cathode stacked on each other, and two ends of the anode are at least partially wrapped by the pixel definition layer.

A part of each of the plurality of isolation structures is disposed on a side of a corresponding pixel definition layer away from a corresponding driving substrate.

In some embodiments, each of the plurality of flexible areas further includes an elastic substrate and an opaque material layer.

The elastic substrate is disposed between adjacent driving substrates.

The opaque material layer is disposed on the elastic substrate and between adjacent pixel definition layers.

A part of each of the plurality of isolation structures is disposed on a side of a corresponding opaque material layer away from a corresponding elastic substrate.

In some embodiments, a material of the opaque material layer is the same as that of the pixel definition layer.

In some embodiments, the opaque material layer is an elastic opaque material layer.

In some embodiments, each of the plurality of isolation structures includes a conductive metal layer and an isolation column sequentially stacked.

The conductive metal layer covers a corresponding one of the plurality of flexible areas, and edges of the conductive metal layer extend out of the corresponding one of the plurality of flexible areas, and the isolation column is disposed on an upper surface of the conductive metal layer.

In some embodiments, each of the edges of each of the plurality of isolation structures extending out of the corresponding one of the plurality of flexible areas is an irregular shape.

A width of the elastic packaging part accounts for 40%-60% of a width of a corresponding one of the plurality of isolation structures.

In some embodiments, the light reflective material body includes two-color electrophoretic particles.

The two-color electrophoretic particles are encapsulated in the elastic packaging part.

The two-color electrophoretic particles include a plurality of first particles and a plurality of second particles.

An upper surface of the elastic packaging part is provided with a first electrode, and a lower surface of the elastic packaging part is provided with a second electrode.

In some embodiments, colors of the plurality of first particles are the same as a color of any sub-pixel adjacent to each of the plurality of isolation structures, and colors of the plurality of second particles are black.

The first electrode is a transparent electrode, and the second electrode is a light-absorbing electrode, the first electrode and the second electrode are elastic electrodes.

Electrical properties of the plurality of first particles are opposite to those of the plurality of second particles; an electrical property of the first electrode is opposite to that of the second electrode.

In some embodiments, the elastic packaging part has a first state, a second state, a third state, and a fourth state.

The first state is a non-display state, the first electrode has a negative electrical property, and the second electrode has a positive electrical property; and in the first state, the plurality of first particles gather towards the lower surface of the elastic packaging part, and the plurality of second particles gather towards the upper surface of the elastic packaging part.

The second state is a display state, the first electrode has a positive electrical property, and the second electrode has a negative electrical property; and in the second state, the plurality of first particles gather towards the upper surface of the elastic packaging part, and the plurality of second particles gather towards the lower surface of the elastic packaging part.

The third state is to stretch the flexible array substrate on the basis of the first state, and the elastic packaging part, the first electrode, and the second electrode are stretched; and in the third state, the plurality of first particles gather towards a position where the second electrode is located, and the plurality of second particles gather towards a position where the first electrode is located, so that the plurality of first particles cover a surface of the second electrode, and the plurality of second particles cover a surface of the first electrode.

The fourth state is to stretch the flexible array substrate on the basis of the second state, and the elastic packaging part, the first electrode, and the second electrode are stretched; and in the fourth state, the plurality of first particles gather towards the position where the first electrode is located, and the plurality of second particles gather towards the position where the second electrode is located, so that the plurality of first particles cover the surface of the first electrode, and the plurality of second particles cover the surface of the second electrode.

In some embodiments, the light reflective material body includes a plurality of cholesteric microcapsules.

The plurality of cholesteric liquid crystals are encapsulated in each of the plurality of cholesteric microcapsules, and the plurality of cholesteric microcapsules are of the same type or are divided into two different types.

An upper surface of the elastic packaging part is provided with a first electrode, and a lower surface of the elastic packaging part is provided with a second electrode, and colors of the plurality of cholesteric liquid crystals encapsulated in each of the plurality of cholesteric microcapsules are the same as a color of an adjacent sub-pixel.

In some embodiments, the first electrode is a transparent electrode, the second electrode is a light-absorbing electrode, and the first electrode and the second electrode are elastic electrodes.

The plurality of cholesteric microcapsules with two different types and located in the elastic packaging part share the same second electrode, and an electrical property of the first electrode is opposite to that of the second electrode.

In some embodiments, the elastic packaging part has a fifth state, a sixth state, and a seventh state.

The fifth state is a non-display state, the first electrode and the second electrode do not provide a voltage; and in the fifth state, ambient light that reaches the plurality of cholesteric microcapsules from the light-emitting layer is absorbed by the plurality of cholesteric liquid crystals and is not reflected.

The sixth state is a display state, the first electrode and the second electrode respectively provide the voltage to the plurality of cholesteric liquid crystals; and in the sixth state, the ambient light that reaches the plurality of cholesteric microcapsules under the action of an electric field is reflected by the plurality of cholesteric liquid crystals, thereby resulting in color development.

The seventh state is to stretch the flexible array substrate on the basis of the sixth state, and the elastic packaging part, the first electrode, and the second electrode are stretched; and in the seventh state, the plurality of cholesteric liquid crystals gather towards a position where the first electrode is located, so that the plurality of cholesteric liquid crystals cover surfaces of the plurality of cholesteric microcapsules towards the first electrode.

Another technical solution in the present disclosure is to provide a flexible display panel. The flexible display panel includes the flexible array substrate, a light sensor, a light supplement component, and a controller.

The flexible array substrate is any flexible array substrate of above embodiments.

The light sensor is configured to detect intensity of light.

The light supplement component is connected to the flexible array substrate and configured for supplementing light to the flexible array substrate.

The controller is configured for controlling the light sensor and the light compensation component.

BRIEF DESCRIPTION OF THE DRAWINGS

In order to more clearly illustrate the technical solutions in some embodiments of the present disclosure, hereinafter, a brief introduction will be given to the accompanying drawings that are used in the description of some embodiments. Obviously, the accompanying drawings in the description below are merely some embodiments of the present disclosure. For those of ordinary skill in the art, other accompanying drawings may be obtained based on these accompanying drawings without any creative efforts.

DETAILED DESCRIPTION

Figure 1:
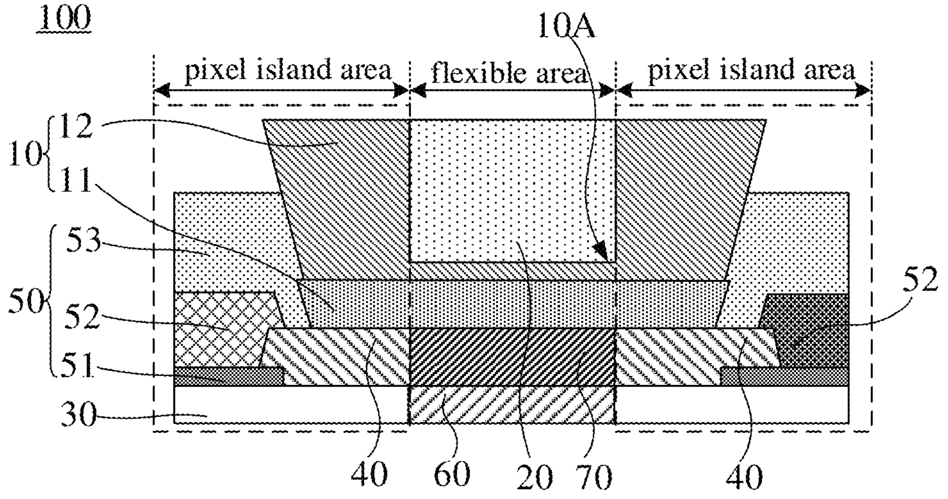
FIG. 1 is a structural schematic view of a flexible array substrate in some embodiments of the present disclosure.

The technical solutions in some embodiments of the present disclosure may be clearly and completely described in conjunction with accompanying drawings in some embodiments of the present disclosure. Obviously, the described embodiments are only a part of the embodiments of the present disclosure, and not all embodiments. Based on the embodiments in the present disclosure, all other embodiments obtained by those of ordinary skill in the art without creative effort are within the scope of the present disclosure.

In the following description, specific details such as specific system structures, interfaces, technologies, etc. are proposed for the purpose of illustration rather than limitation, so as to fully understand the present disclosure.

The terms "first", "second", and "third" in the present disclosure are only configured to describe purposes and cannot be understood as indicating or implying relative importance or implicit indicating the quantity of technical features indicated. Therefore, features limited to "first", "second", and "third" may explicitly or implicitly include at least one of these features. In the description of the present disclosure, "multiple" means at least two, such as two, three, etc., unless otherwise expressly and specifically qualified. All directional indications (such as up, down, left, right, front, rear, or the like) in some embodiments of the present disclosure are only configured to explain a relative position relationship between components in a specific posture (as shown in the accompanying drawings), a motion situation between the components in the specific posture (as shown in the accompanying drawings), or the like. If the specific posture is changed, the directional indication is also changed accordingly. In addition, the terms "including", "comprising", and "having", as well as any variations of the terms "including", "comprising", and "having", are intended to cover non-exclusive inclusions. For example, a process, method, system, product, or device that includes a series of operations or units is not limited to the listed operations or units, but optionally includes operations or units that are not listed, or optionally includes other operations or units that are inherent to these processes, methods, products, or devices.

The reference to "embodiment" in the present disclosure means that, specific features, structures, or characteristics described in conjunction with some embodiments may be included in at least one embodiment of the present disclosure. The phrase appearing in various positions in the specification does not necessarily refer to the same embodiment, nor is it an independent or alternative embodiment that is mutually exclusive with other embodiments. Those of ordinary skill in the art explicitly and implicitly understand that the embodiments described in the present disclosure may be combined with other embodiments.

The present disclosure may be explained in detail by combining the accompanying drawings and some embodiments.

The present disclosure provides a flexible array substrate and a flexible display panel, mainly configured to solve technical problems of the existing flexible array substrate being stretched, resulting in a decrease in resolution, an increase in the graininess of the displayed image, and a deterioration of the user experience.

As illustrated in FIG. 1, FIG. 1 is a structural schematic view of a flexible array substrate in some embodiments of the present disclosure. The present disclosure provides a flexible array substrate 100, and the flexible array substrate 100 includes a plurality of pixel island areas that are sequentially arranged and a plurality of flexible areas, and each of the plurality of flexible areas is disposed between adjacent pixel island areas. Each flexible area includes an elastic packaging part 20, and the elastic packaging part 20 is configured for pixel compensation. The flexible array substrate 100 includes a plurality of isolation structures 10. Each isolation structure 10 covers or is in a corresponding one of the plurality of flexible areas, and edges of the isolation structure 10 extend out of corresponding flexible area. An upper surface of the isolation structure 10 defines a groove 10A, and the elastic packaging part 20 is disposed in the groove 10A. The elastic packaging part 20 includes a light reflective material body (not shown in the figures). The light reflective material body is configured for pixel compensation. A material of the light reflective material body is not limited in the present disclosure, as long as the light reflective material body may selectively reflect light with the same color as adjacent sub-pixels 50, so as to achieve the pixel compensation. In the following embodiments, the present disclosure mainly takes a light reflective material layer including two-color electrophoretic particles 21 (see FIG. 3) as an example for explanation, or mainly takes a light reflective material layer including cholesteric microcapsules 24 (see FIG. 8) including cholesteric liquid crystals D as an example for explanation. The flexible array substrate 100 is provided with the elastic packaging part 20 in the groove 10A on the surface of the isolation structure 10, so that the elastic packaging part 20 including the light reflective material body may achieve pixel compensation during stretching the flexible array substrate 100, thereby improving resolution of the flexible array substrate 100 and achieving better display effects, providing users with a better product experience. Furthermore, because the elastic packaging part 20 has elasticity, the elastic packaging part 20 further increases stretchability of the flexible array substrate 100.

In some embodiments, a width of the elastic packaging part 20 accounts for 40%-60% of a width of the isolation structure 10. That is, the width of a part of the isolation structure 10 in each pixel island area accounts for 20%-30% of the width of entire isolation structure 10. The elastic packaging part 20, including the light reflective material body, may achieve pixel compensation effect during stretching. In theory, the wider the width of the elastic packaging part 20, the better. However, the isolation structure 10 in each pixel island area also needs to have tensile strength, thus the isolation structure 10 in each pixel island area should also have a certain width.

In some embodiments, the pixel island area further includes a driving substrate 30, a pixel definition layer 40, and a plurality of sub-pixels 50. The driving substrate 30 is configured to drive the sub-pixels 50 for emitting light. The pixel definition layer 40 is disposed on the driving substrate 30. The pixel definition layer 40 protrudes from the driving substrate 30, so as to form a pixel accommodating area (not shown in the figures). The sub-pixels 50 are disposed in the pixel accommodating area. A part of the isolation structure 10 is disposed on a side of the pixel definition layer 40 away from the driving substrate 30.

In some embodiments, the pixel definition layer 40 is an insulation layer. The pixel definition layer 40 may be a single-layer structure composed of one insulating material or a single-layer structure composed of two or more insulating materials. The pixel definition layer 40 may also be a multi-layer structure composed of two or more inorganic insulation materials, which is not limited in the present disclosure.

In some embodiments, each sub-pixel 50 includes an anode 51, a light-emitting layer 52, and a cathode 53 that are stacked on each other. At least part of two ends of the anode 51 are wrapped by the pixel definition layer 40. The light-emitting layer 52 is located on a side of the anode 51 away from the driving substrate 30. The cathode 53 is located on a side of the light-emitting layer 52 away from the driving substrate 30, and is in contact with and conductive to a part of the isolation structure 10. The anode 51 and the cathode 53 are configured to control the light-emitting layer 52 of each sub-pixel 50 for emitting light. The plurality of sub-pixels 50 are multiple, and each of the plurality of sub-pixels 50 is one pixel corresponding to one kind of color. The pixel accommodating areas are multiple, and a single pixel accommodating area is configured for accommodating at least one sub-pixel 50. Arrangement of the sub-pixels 50 is not limited in the present disclosure. In following embodiments of the present disclosure, two adjacent sub-pixels 50 are mainly taken as an example for explanation. In some embodiments, one pixel accommodating area is configured to accommodate one sub-pixel 50.

In some embodiments, the flexible area further includes an elastic substrate 60 and an opaque material layer 70. The elastic substrate 60 is disposed between adjacent driving substrates 30, and may be used as a stretching compensation during stretching the flexible array substrate 100, resulting in better stretchability of the flexible array substrate 100. The opaque material layer 70 is disposed on the elastic substrate 60 and is located between two adjacent pixel definition layers 40. In some embodiments, a material of the opaque material layer 70 may be the same as that of the pixel definition layer 40, and/or, the opaque material layer 70 is an elastic opaque material layer 70. The opaque material layer 70 may be made of the same material as the pixel definition layer 40, that is, the opaque material layer 70 in the flexible area is the pixel definition layer 40. The opaque material layer 70 may further be the elastic opaque material layer 70, and the elastic opaque material layer 70 may further also serve as the stretching compensation during stretching the flexible array substrate 100, making the stretchability of the flexible array substrate 100 better. The opaque material layer 70 is opaque and may not cause color mixing. In some embodiments, the opaque material layer 70 being the elastic opaque material layer 70 is mainly taken as an example. In some embodiments, the elastic substrate 60 may be made of polyimide (PI) or other flexible materials, and a thickness of the elastic substrate 60 is the same as that of the driving substrate 30.

As illustrated in FIG. 1, the isolation structure 10 includes a conductive metal layer 11 and an isolation column 12 sequentially stacked. The conductive metal layer 11 covers or in the flexible area and edges of the conductive metal layer 11 extend out of the flexible area. The isolation column 12 is disposed on an upper surface of the conductive metal layer 11. The isolation structure 10 separates the light-emitting layer 52 of each sub-pixel 50 and the cathodes 53 of different colored sub-pixels 50, so as to avoid the problem of light crosstalk between sub-pixels 50. Furthermore, the cathode 53 of each sub-pixel 50 is conductive to the conductive metal layer 11 of the isolation structure 10, so as to conduct the cathode 53 of each sub-pixel 50 through the conductive metal layer 11. The upper surface of the present disclosure refers to a surface on a side away from the driving substrate 30.

Figure 2:
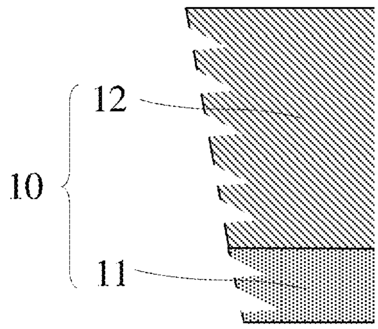
FIG. 2 is an enlarged schematic view of an edge of an isolation structure extending out of a flexible area.

In some embodiments, as illustrated in FIG. 1, the edge of the isolation structure 10 extending out of the flexible area is a regular oblique plane. In some embodiments, the isolation structure 10 may have a regular shape at any edge, which is not limited in the present disclosure. In some embodiments, as illustrated in FIG. 2, FIG. 2 is an enlarged schematic view of an edge of an isolation structure extending out of a flexible area, the edge of the isolation structure 10 extending out of the flexible area is an irregular shape, such as, a serrated shape, a grooming shape, or the like, which is not limited in the present disclosure. This setting is to further reduce the possibility of separation of the flexible array substrate 100 during stretching.

Figure 3:
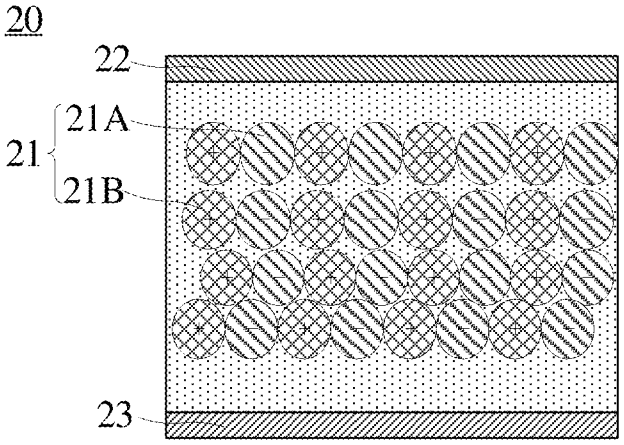
FIG. 3 is a structural schematic view of an elastic packaging part in some embodiments of the present disclosure.

As illustrated in FIG. 3, FIG. 3 is a structural schematic view of an elastic packaging part in some embodiments of the present disclosure. The light reflective material body includes two-color electrophoretic particles 21. The two-color electrophoretic particles 21 are encapsulated in the elastic packaging part 20. In some embodiments, the two-color electrophoretic particle 21 includes a plurality of first particles 21A and a plurality of second particles 21B. An upper surface of the elastic packaging part 20 is provided with a first electrode 22, and a lower surface of the elastic packaging part 20 is provided with a second electrode 23. In some embodiments, electrical properties of the plurality of first particles 21A are opposite to those of the plurality of second particles 21B. The first electrode 22 is a transparent electrode, and the second electrode 23 is a light-absorbing electrode. In some embodiments, the first electrode 22 and the second electrode 23 are both elastic electrodes. An electrical property of the first electrode 22 is opposite to that of the second electrode 23. In some embodiments, the colors of the plurality of first particles 21A are the same as the color of any sub-pixel 50 adjacent to the isolation structure 10. That is, the colors of the plurality of first particles 21A may be any one of red, green, or blue. The colors of the plurality of second particles 21B are black. The elastic packaging part 20 may achieve pixel compensation in the flexible array substrate 100, thereby improving the resolution of the flexible array substrate 100, achieving better display effects, and providing the users with a better product experience. Furthermore, the elastic packaging part 20 also increases the stretchability of the flexible array substrate 100.

The elastic packaging part 20 includes the two-color electrophoretic particles 21 composed of the plurality of first particles 21A and the plurality of second particles 21B. The plurality of first particles 21A and the plurality of second particles 21B are two types of nanoscale spherical particles with different electrical properties. In some embodiments, during stretching the flexible array substrate 100, the first electrode 22 and the second electrode 23 may extend and be restored to their original state along with the elastic packaging part 20. Because the upper surface of the elastic packaging part 20 needs to maintain a function of light transmission, the first electrode 22 is the transparent electrode. The lower surface of the elastic packaging part 20 needs to prevent color mixing between the sub-pixels 50, thus, the second electrode 23 is the light-absorbing electrode. In some embodiments, the second electrode 23 is a black light-absorbing electrode.

Figure 4:
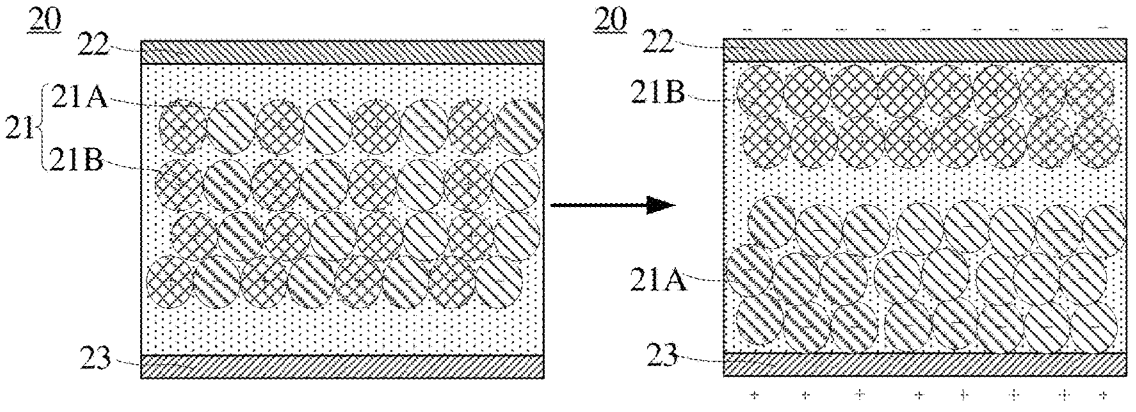
FIG. 4 is a schematic view of a first state of the elastic packaging part in some embodiments of the present disclosure.
Figure 5:
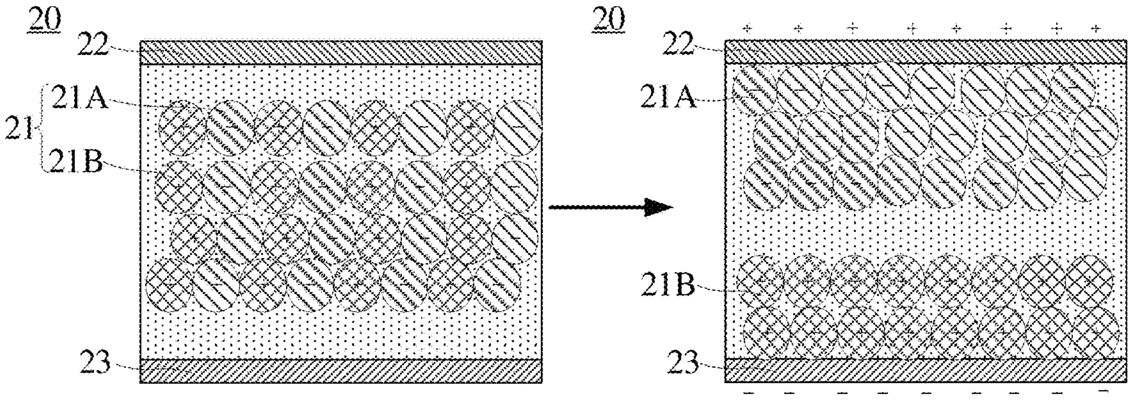
FIG. 5 is a schematic view of a second state of the elastic packaging part in some embodiments of the present disclosure.
Figure 6:
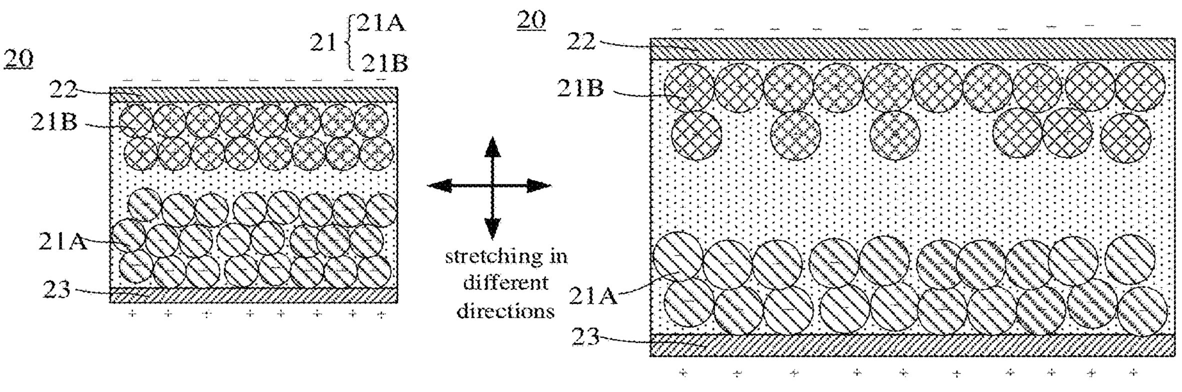
FIG. 6 is a schematic view of a third state of the elastic packaging part in some embodiments of the present disclosure.
Figure 7:
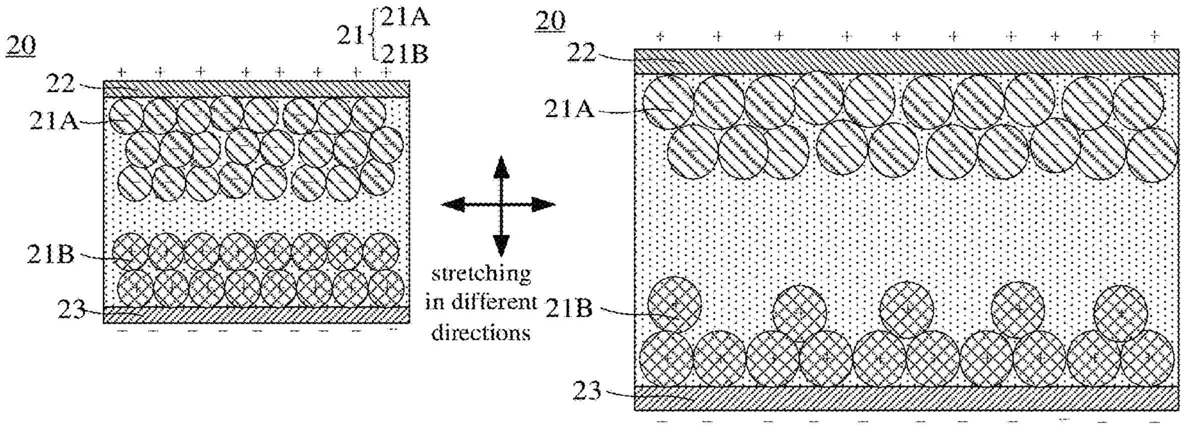
FIG. 7 is a schematic view of a fourth state of the elastic packaging part in some embodiments of the present disclosure.

As illustrated in FIG. 4, FIG. 5, FIG. 6, and FIG. 7, FIG. 4 is a schematic view of a first state of the elastic packaging part in some embodiments of the present disclosure, FIG. 5 is a schematic view of a second state of the elastic packaging part in some embodiments of the present disclosure, FIG. 6 is a schematic view of a third state of the elastic packaging part in some embodiments of the present disclosure, and FIG. 7 is a schematic view of a fourth state of the elastic packaging part in some embodiments of the present disclosure. Due to the opposite electrical properties of the plurality of first particles 21A and the plurality of second particles 21B, by applying an electric field to the first electrode 22 on the upper surface of the elastic packaging part 20 and the second electrode 23 on the lower surfaces of the elastic packaging part 20, the plurality of first particles 21A and the plurality of second particles 21B may selectively perform directional motions. The elastic packaging part 20 may have four states under the action of an electric field, namely a first state, a second state, a third state, and a fourth state. In some embodiments, the plurality of first particles 21A having the negative electrical properties and the plurality of second particles 21B (black) having the positive electrical properties are taken as an example.

As illustrated in FIG. 4, the first state of the elastic packaging part 20 is a non-display state. The negative charges are applied to the first electrode 22, so that the first electrode 22 has the negative electrical property. The positive charges are applied to the second electrode 23, so that the second electrode 23 has the positive electrical property. In the first state, the plurality of first particles 21A gather towards the lower surface of the elastic packaging part 20, and the plurality of second particles 21B gather towards the upper surface of the elastic packaging part 20. In this case, the elastic packaging part 20 is in a light-absorbing state and does not have a reflective effect on light.

As illustrated in FIG. 5, the second state of the elastic packaging part 20 is a display state. The positive charges are applied to the first electrode 22, so that the first electrode 22 has the positive electrical property. The negative charges are applied to the second electrode 23, so that the second electrode 23 has the negative electrical property. In the second state, the plurality of first particles 21A gather towards the upper surface of the elastic packaging part 20, and the plurality of second particles 21B gather towards the lower surface of the elastic packaging part 20. In this case, the elastic packaging part 20, which serves as the pixel compensation, is in a reflective state, thereby achieving the pixel compensation effect.

As illustrated in FIG. 6, the third state is to stretch the flexible array substrate 100 on the basis of the first state, and the elastic packaging part 20, the first electrode 22, and the second electrode 23 are stretched, with no restriction on a stretching direction. In the third state, the plurality of first particles 21A gather towards a position where the second electrode 23 is located, and the plurality of second particle 21B gather towards a position where the first electrode 22 is located, so that the plurality of first particles 21A cover a surface of the second electrode 23, and the plurality of second particles 21B cover a surface of the first electrode 22.

As illustrated in FIG. 7, the fourth state is to stretch the flexible array substrate 100 on the basis of the second state, and the elastic packaging part 20, the first electrode 22, and the second electrode 23 are stretched, with no restriction on the stretching direction. In the fourth state, the plurality of first particles 21A gather towards the position where the first electrode 22 is located, and the plurality of second particles 21B gather towards the position where the second electrode 23 is located, so that the plurality of first particles 21A cover the surface of the first electrode 22, and the plurality of second particles 21B cover the surface of the second electrode 23.

As illustrated in FIG. 6 and FIG. 7, the flexible array substrate 100 is stretched in different directions, and the elastic packaging part 20, the first electrode 22, and the second electrode 23 are stretched. The plurality of first particles 21A and the plurality of second particles 21B inside the elastic packaging part 20 may also move under the action of the electric field. In some embodiments, as long as the amount of the plurality of first particles 21A and/or the amount of the plurality of second particles 21B may cover entire surface of the first electrode 22 close to the elastic packaging part 20 and/or cover entire surface of the second electrode 23 close to the elastic packaging part 20 in a maximum stretching state.

The third state is a state and a simple representation after stretching in the first state, and the fourth state is a state and a simple representation after stretching in the second state. The third state and the fourth state do not change the electric field applied in the original state of the first state, and do not change the electric field applied in the original state of the second state. The third state and the fourth state are only intended to illustrate that in response to the flexible array substrate 100 in some embodiments of the present disclosure being in the maximum stretching state, the plurality of first particles 21A and the plurality of second particles 21B may cover entire surface of the first electrode 22 close to the elastic packaging part 20 and cover entire surface of the second electrode 23 close to the elastic packaging part 20, so as to achieve the pixel compensation.

Figure 8:
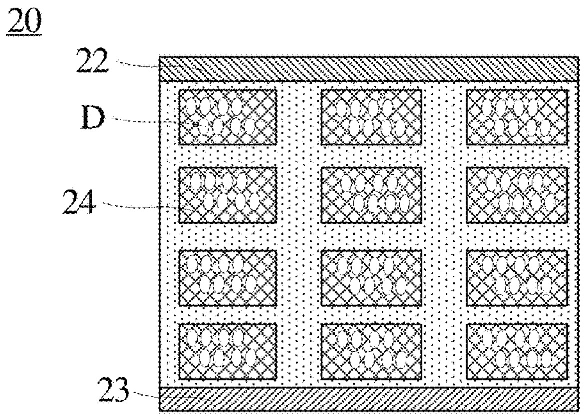
FIG. 8 is a structural schematic view of the elastic packaging part in some embodiments of the present disclosure.
Figure 9:
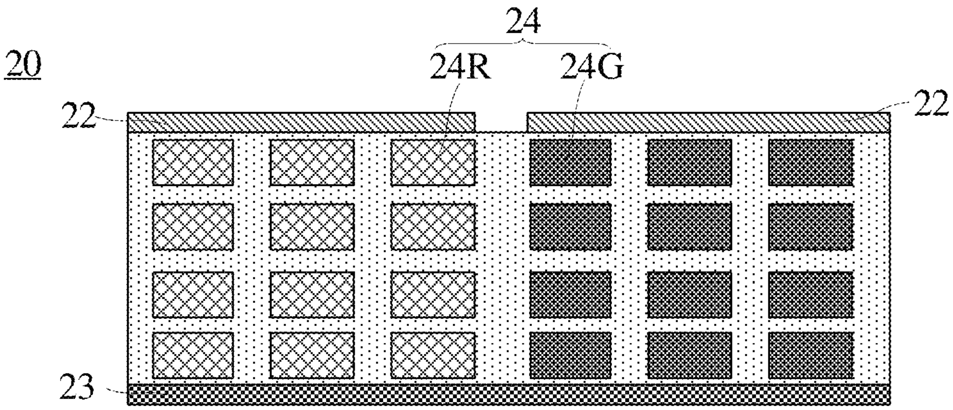
FIG. 9 is a structural schematic view illustrating two different types of cholesteric microcapsules sharing the same second electrode in some embodiments of the present disclosure.

As illustrated in FIG. 8 and FIG. 9, FIG. 8 is a structural schematic view of the elastic packaging part in some embodiments of the present disclosure, and FIG. 9 is a structural schematic view illustrating two different types of cholesteric microcapsules sharing the same second electrode in some embodiments of the present disclosure. In some embodiments, the light reflective material body includes a plurality of cholesteric microcapsules 24, and the plurality of cholesteric microcapsules 24 are encapsulated in the elastic packaging part 20. A plurality of cholesteric liquid crystals D are encapsulated in each cholesteric microcapsule 24. The upper surface of the elastic packaging part 20 is provided with the first electrode 22, and the lower surface of the elastic packaging part 20 is provided with the second electrode 23. In some embodiments, the elastic packaging part 20 includes the plurality of cholesteric microcapsules 24 with the same type or two different types. In some embodiments, the colors of the plurality of cholesteric liquid crystals D encapsulated in the cholesteric microcapsule 24 are the same as the colors of the adjacent sub-pixels 50. The colors of the plurality of cholesteric liquid crystals D may be any one or two of red, green, or blue. Here, red cholesteric liquid crystals D are taken as an example for explanation. The plurality of cholesteric liquid crystals D reflecting red light are encapsulated in fixed size cholesteric microcapsules 24. In some embodiments, a length and a width of each cholesteric microcapsule 24 range from 1 μm to 30 μm, and a height of each cholesteric microcapsule 24 ranges from 10 μm to 20 μm.

In some embodiments, an area and a shape of each cholesteric microcapsule 24 may be adjusted when viewed from above. Each cholesteric microcapsule 24 may be encapsulated and fixed using organic materials, and entire cholesteric microcapsule 24 is in a film form. A plurality of connection holes are defined between different cholesteric microcapsules by using a laser. In some embodiments, by changing magnitude of a voltage applied to the first electrode 22 and second electrode 23 of the elastic packaging part 20, the plurality of cholesteric liquid crystals D may exhibit a characteristic of reflecting the red light. In response to the plurality of cholesteric liquid crystals D are required to not reflect the red light, the incident light may be absorbed by the bottom of each cholesteric microcapsule 24. The plurality of cholesteric liquid crystals D inside each cholesteric microcapsule 24 may achieve the pixel compensation during stretching the flexible array substrate 100, thereby improving the resolution of the flexible array substrate 100 and achieving better display effects, providing the users with a better product experience. Furthermore, because the elastic packaging part 20 has the elasticity, the elastic packaging part 20 may further increases the stretchability of the flexible array substrate 100.

In some embodiments, the first electrode 22 is the transparent electrode, and the second electrode 23 is the light-absorbing electrode. The first electrode 22 and the second electrode 23 are both elastic electrodes. Because the upper surface of the elastic packaging part 20 needs to maintain the function of light transmission, the first electrode 22 is the transparent electrode. The lower surface of the elastic packaging part 20 needs to prevent color mixing between the sub-pixels 50, thus, the second electrode 23 is the light-absorbing electrode. In some embodiments, the second electrode 23 is the black light-absorbing electrode. In some embodiments, the first electrode 22 and the second electrode 23 may extend and be restored to their original state along with the elastic packaging part 20 during stretching the flexible array substrate 100. The electrical property of the first electrode 22 is opposite to that of the second electrode 23.

As illustrated in FIG. 9, multiple different types of cholesteric microcapsules 24 located in the elastic packaging part 20 share the same second electrode 23. The colors of the cholesteric liquid crystals D encapsulated in each cholesteric microcapsule 24 is the same as the color of the adjacent sub-pixels 50. The colors of the cholesteric liquid crystals D may be any one or two of red, green, or blue. In some embodiments, the red cholesteric liquid crystals and green cholesteric liquid crystals are mainly taken as examples for explanation. The elastic packaging part 20 is divided into two parts, namely, a first part consists of R-type cholesteric microcapsules 24R arranged in a plurality of arrays adjacent to the red sub-pixels 50, and a plurality of red cholesteric liquid crystals are encapsulated inside each R-type cholesteric microcapsule 24R. The second part consists of G-shaped cholesteric microcapsules 24G arranged in a plurality of arrays adjacent to the green sub-pixels 50, and a plurality of green cholesteric liquid crystals are encapsulated inside each G-shaped cholesteric microcapsule 24G. In some embodiments, each of the first part and second part has independent first electrode 22 to provide the electric field, thereby providing required chromogenic sites for the R-type cholesteric microcapsules 24R and the G-type cholesteric microcapsules 24G, respectively. In some embodiments, the first part and the second part share the same second electrode 23.

Due to the fact that the plurality of cholesteric liquid crystals D encapsulated in the elastic packaging part 20 reflects light with fixed wavelength and color under different electric fields, the elastic packaging part 20 may have three states under the action of the electric field, namely, a fifth state, a sixth state, and a seventh state.

Figure 10:
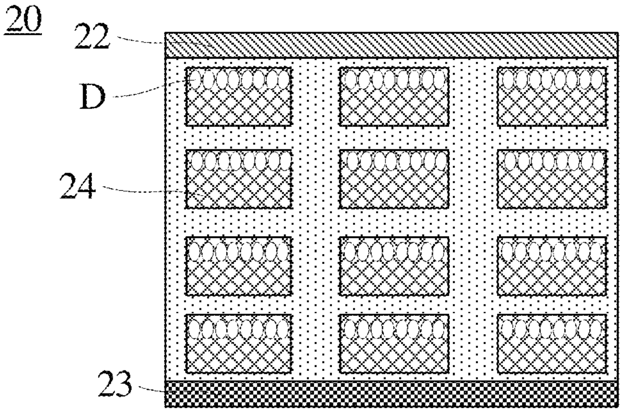
FIG. 10 is a schematic view of a seventh state of the elastic packaging part in some embodiments of the present disclosure.

As illustrated in FIG. 8 and FIG. 9. The fifth state of the elastic packaging part 20 is the non-display state. In the non-display state, the plurality of cholesteric liquid crystals D of the elastic packaging part 20 do not needs color development, thus, the first electrode 22 and the second electrode 23 do not provide the voltage. In the fifth state, ambient light that reaches the cholesteric microcapsules 24 from the light-emitting layer 52 may be absorbed by the plurality of cholesteric liquid crystals D and is not reflected. The sixth state of the elastic packaging part 20 is the display state. In the display state, the plurality of cholesteric liquid crystals D of the elastic packaging part 20 needs the color development. Thus, the first electrode 22 and the second electrode 23 respectively provide the voltage required for deflection to the plurality of cholesteric liquid crystals D. In the sixth state, the ambient light that reaches the cholesteric microcapsules 24 under the action of the electric field may be reflected by the plurality of cholesteric liquid crystals D, resulting in the color development. As illustrated in FIG. 10, FIG. 10 is a schematic view of a seventh state of the elastic packaging part in some embodiments of the present disclosure. The seventh state of the elastic packaging part 20 is to stretch the elastic packaging part 20 on the basis of the sixth state. The elastic packaging part 20 and its included first electrode 22 and second electrode 23 are both stretched, with no restriction on the stretching direction. In the seventh state, the plurality of cholesteric liquid crystals D gather towards the position where the first electrode 22 is located, so that the plurality of cholesteric liquid crystals D cover a surface of the cholesteric microcapsule 24 towards the first electrode 22.

During stretching the elastic packaging part 20 in the non-display state, the plurality of cholesteric liquid crystals D of the elastic packaging part 20 do not need the color development in the non-display state. Thus, the first electrode 22 and the second electrode 23 do not provide the voltage. Like the fifth state, the ambient light that reaches the cholesteric microcapsules 24 from the light-emitting layer 52 may also be absorbed by the plurality of cholesteric liquid crystals D and is not reflected.

The seventh state is a state and a simple representation after stretching in the sixth state, and does not change the electric field applied in the original state of the sixth state. The seventh state is only intended to illustrate that in response to the flexible array substrate 100 in some embodiments of the present embodiment being in the maximum stretching state, the plurality of cholesteric liquid crystals D may cover entire surface of the cholesteric microcapsule 24 towards the first electrode 22, so as to achieve the pixel compensation.

Figure 11:
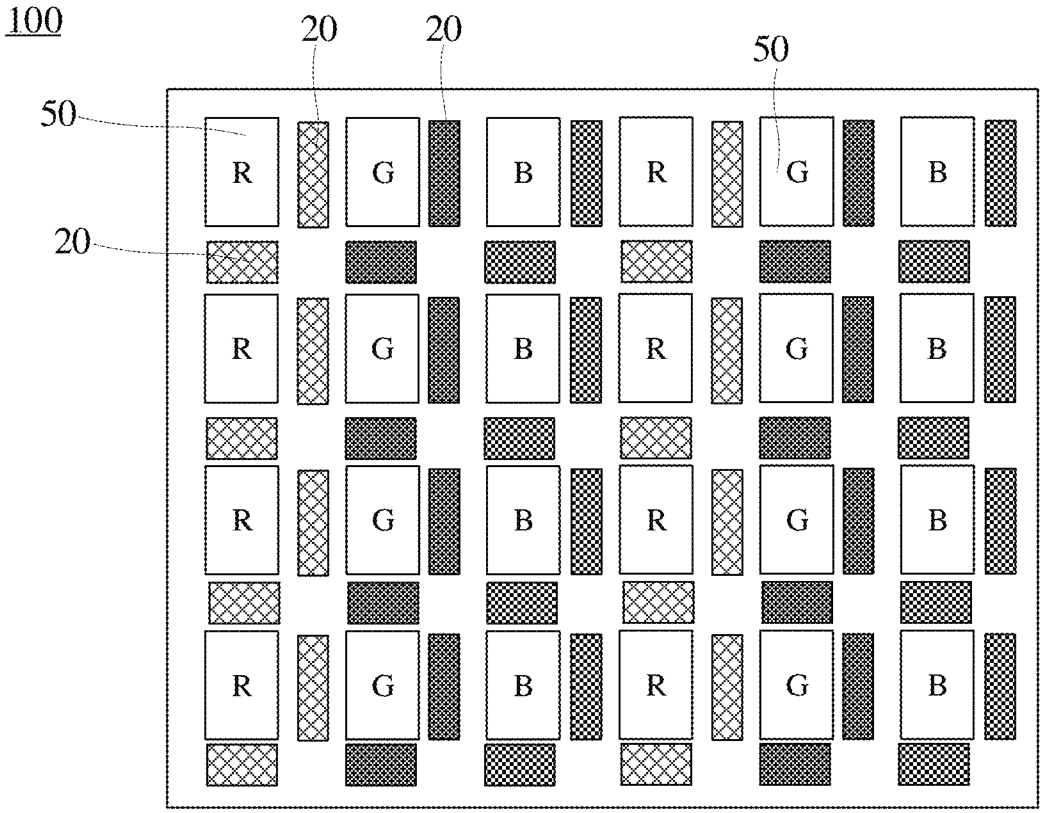
FIG. 11 is a structural schematic top view of a flexible array substrate including a light reflective material body including two-color electrophoretic particles in some embodiments of the present disclosure.
Figure 12:
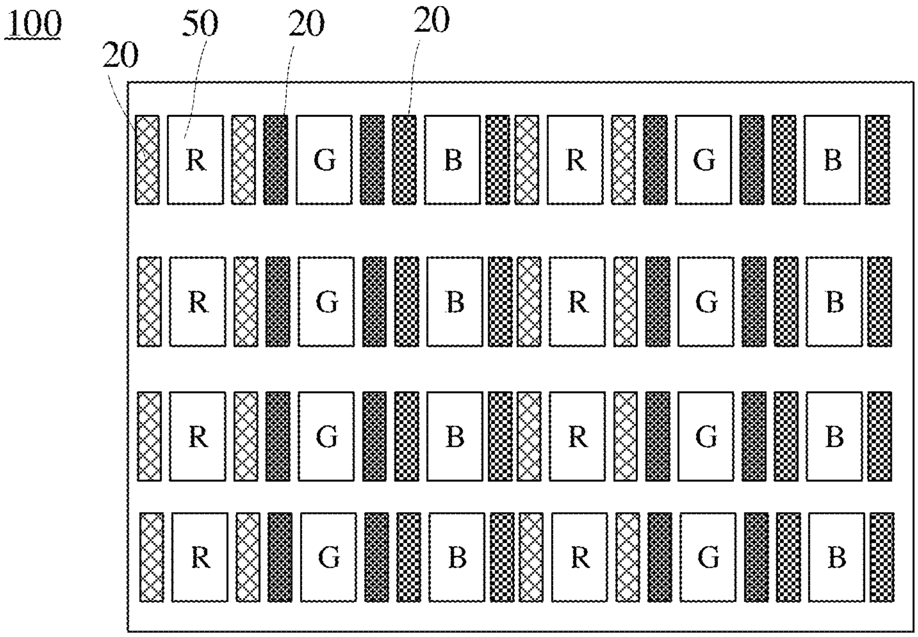
FIG. 12 is a structural schematic top view of a flexible array substrate including a light reflective material body including cholesteric liquid crystals in some embodiments of the present disclosure.

As illustrated in FIG. 11, FIG. 11 is a structural schematic top view of a flexible array substrate including a light reflective material body including two-color electrophoretic particles in some embodiments of the present disclosure. FIG. 11 clearly illustrates pixel arrangement and the position arrangement of the elastic packaging part 20 as the compensation pixels. In some embodiments, the pixel arrangement of RGB S-Strip is taken as an example. That is, the elastic packaging parts 20 with corresponding colors are disposed next to each sub-pixel 50 as the compensation pixels. The elastic packaging part 20 serves as the compensation pixel for directionally compensating the color of adjacent sub-pixels 50. Thus, the first electrode 22 and the second electrode 23 need to determine the positive and negative electrical properties based on the display of adjacent sub-pixels 50. In response to the adjacent sub-pixels 50 being in the display state, it is necessary to drive the elastic packaging part 20 to present the second state. In response to the adjacent sub-pixels 50 being in the non-display state, it is necessary to drive the elastic packaging part 20 to present the first state. As illustrated in FIG. 12, FIG. 12 is a structural schematic top view of a flexible array substrate including a light reflective material body including cholesteric liquid crystals in some embodiments of the present disclosure. In some embodiments, the pixel arrangement of RGB S-Strip is taken as an example. That is, the elastic packaging parts 20 with corresponding colors are disposed next to each sub-pixel 50 as the compensation pixels. Regardless of the original arrangement of the sub-pixels 50, as long as it is only necessary to set the elastic packaging part 20 as the compensation pixel for the adjacent sub-pixels 50. The same elastic packaging part 20 may only include one type of cholesteric microcapsules 24, or two different types of cholesteric microcapsules 24, so as to achieve the pixel compensation for the adjacent sub-pixels 50.

Figure 13:
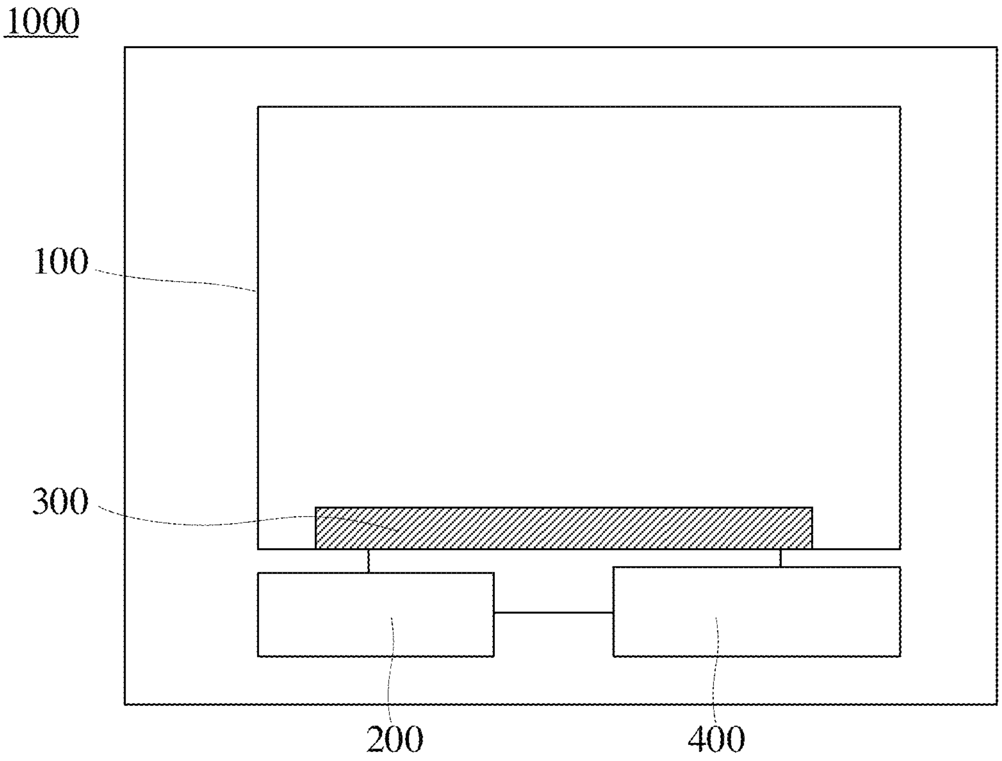
FIG. 13 is a structural schematic view of a flexible display panel in some embodiments of the present disclosure.

As illustrated in FIG. 13, FIG. 13 is a structural schematic view of a flexible display panel in some embodiments of the present disclosure. The present disclosure further provides a flexible display panel 1000. The flexible display panel 1000 includes the flexible array substrate 100, a light sensor 200, a light supplement component 300, and a controller 400. The flexible array substrate 100 refers to the flexible array substrate 100 in any one of the above embodiments. The structure and specific functions of the flexible array substrate 100 are described in the above embodiments and may not be repeated here. The light sensor 200 is configured to detect intensity of light. The light supplement component 300 is connected to the flexible array substrate 100 and configured for supplementing light to the flexible array substrate 100. The controller 400 is configured to control the light sensor 200 and the light supplement component 300. The light displayed by the elastic packaging part 20 of the flexible array substrate 100 comes from external ambient light. That is, either the external environment is not dark, or it is necessary to use the light sensor 200 to supplement the light of the elastic packaging part 20 in a dark environment. In response to the presence of the external ambient light, the light sensor 200 may sense the intensity of the light, the compensation effect of the elastic packaging part 20 is calculated, and then the brightness of the sub-pixels 50 (as shown in FIG. 11) is adjusted, so as to achieve the pixel compensation effect, so that the flexible display panel 1000 may achieve better display effect. In some embodiments, the light supplement component 300 is connected to the flexible array substrate 100, and a light intensity preset value is set through the controller 400. Then, the intensity of the external ambient light is detected by the light sensor 200, and the light supplement component 300 is controlled based on the intensity of the external ambient light, so as to change supplement light intensity of the light supplement component 300. In response to the intensity of the external ambient light and the intensity of the light of the light supplement component 300 reach a preset value, compensation brightness of the elastic packaging part 20 may be fixed.

The flexible display panel 1000 may adjust the light intensity of the elastic packaging part 20 according to the intensity of external ambient light, thereby achieving better pixel compensation. Furthermore, the flexible display panel 1000 includes the flexible array substrate 100, thus the elastic packaging part 20 including the light reflective material body may achieve the pixel compensation during stretching the flexible display panel 1000, thereby improving the resolution of the flexible display panel 1000 and achieving better display effects, and providing the users with a better product experience. In addition, the elastic packaging part 20 has the elasticity, thus the elastic packaging part 20 further increases the stretchability of the flexible display panel 1000.

The present disclosure provides a flexible array substrate and a flexible display panel. The flexible array substrate includes a plurality of pixel island areas sequentially arranged, a plurality of flexible areas, and a plurality of isolation structures. Each of the plurality of flexible areas is disposed between adjacent two of the plurality of pixel island areas. Each of the plurality of isolation structures covers a corresponding one of the plurality of flexible areas, edges of each of the plurality of isolation structures extend out of the corresponding one of the plurality of flexible areas, and an upper surface of each of the plurality of isolation structures defines a groove. Each of the plurality of flexible areas includes an elastic packaging part disposed in the groove and including a light reflective material body. The light reflective material body is configured for pixel compensation. The flexible array substrate is provided with the elastic packaging part including the light reflective material body in the groove on the surface of the isolation structure, so that the elastic packaging part including the light reflective material body may achieve pixel compensation during stretching the flexible array substrate, thereby improving resolution of the flexible array substrate and making the flexible array substrate have better display effects, providing users with a better product experience. Furthermore, because the elastic packaging part has elasticity, the elastic packaging part further increases stretchability of the flexible array substrate.

It is obvious to those skilled in the art that the present disclosure is not limited to the details of the exemplary embodiments mentioned above, and may be implemented in other specific forms without departing from the spirit or basic features of the present disclosure. Thus, from any perspective, the embodiments should be regarded as exemplary and non-restrictive. The scope of the present disclosure is limited by the accompanying claims rather than the above description. Thus, it is intended to encompass all variations in the meaning and scope of the same elements of the claims in the present disclosure. Any drawing labels in the claims should not be regarded as limiting the claims involved.

The above descriptions are only some embodiments of the present disclosure, and are not intended to limit the scope of the present disclosure. Any equivalent structure or equivalent flow transformation made by using the contents of the specification and accompanying drawings of the present disclosure, or directly or indirectly applied to other related technical fields, is included in the scope of the patent protection of the present disclosure.

What is claimed is:

1. A flexible array substrate, comprising:

a plurality of pixel island areas sequentially arranged;

a plurality of flexible areas, wherein each of the plurality of flexible areas is disposed between adjacent two of the plurality of pixel island areas; and a plurality of isolation structures, wherein each of the plurality of isolation structures covers a corresponding one of the plurality of flexible areas, edges of each of the plurality of isolation structures extend out of the corresponding one of the plurality of flexible areas, and an upper surface of each of the plurality of isolation structures defines a groove;

wherein each of the plurality of flexible areas comprises:

an elastic packaging part disposed in the groove and comprising a light reflective material body;

the light reflective material body is configured for pixel compensation.

2. The flexible array substrate according to claim 1, wherein each of the plurality of pixel island areas comprises:

a driving substrate;

a pixel definition layer disposed on the driving substrate, wherein the pixel definition layer protrudes from the driving substrate to form a pixel accommodation area;

a plurality of sub-pixels disposed in the pixel accommodation area, wherein each of the plurality of sub-pixels comprises an anode, a light-emitting layer, and a cathode stacked on each other, and two ends of the anode are at least partially wrapped by the pixel definition layer;

wherein a part of each of the plurality of isolation structures is disposed on a side of a corresponding pixel definition layer away from a corresponding driving substrate.

3. The flexible array substrate according to claim 1, wherein each of the plurality of flexible areas further comprises:

an elastic substrate, disposed between adjacent driving substrates; and an opaque material layer, disposed on the elastic substrate and between adjacent pixel definition layers;

wherein a part of each of the plurality of isolation structures is disposed on a side of a corresponding opaque material layer away from a corresponding elastic substrate.

4. The flexible array substrate according to claim 3, wherein, a material of the opaque material layer is the same as that of the pixel definition layer; and/or, the opaque material layer is an elastic opaque material layer.

5. The flexible array substrate according to claim 1, wherein each of the plurality of isolation structures comprises a conductive metal layer and an isolation column sequentially stacked;

wherein the conductive metal layer covers a corresponding one of the plurality of flexible areas, and edges of the conductive metal layer extend out of the corresponding one of the plurality of flexible areas, and the isolation column is disposed on an upper surface of the conductive metal layer.

6. The flexible array substrate according to claim 5, wherein each of the edges of each of the plurality of isolation structures extending out of the corresponding one of the plurality of flexible areas is an irregular shape; and a width of the elastic packaging part accounts for 40%-60% of a width of a corresponding one of the plurality of isolation structures.

7. The flexible array substrate according to claim 1, wherein the light reflective material body comprises:

two-color electrophoretic particles, encapsulated in the elastic packaging part;

wherein the two-color electrophoretic particles comprise a plurality of first particles and a plurality of second particles; and an upper surface of the elastic packaging part is provided with a first electrode, and a lower surface of the elastic packaging part is provided with a second electrode.

8. The flexible array substrate according to claim 7, wherein colors of the plurality of first particles are the same as a color of any sub-pixel adjacent to each of the plurality of isolation structures, and colors of the plurality of second particles are black;

the first electrode is a transparent electrode, and the second electrode is a light-absorbing electrode, the first electrode and the second electrode are elastic electrodes; and electrical properties of the plurality of first particles are opposite to that of the plurality of second particles; an electrical property of the first electrode is opposite to that of the second electrode.

9. The flexible array substrate according to claim 8, wherein the elastic packaging part has a first state, a second state, a third state, and a fourth state:

the first state is a non-display state, the first electrode has a negative electrical property, and the second electrode has a positive electrical property; and in the first state, the plurality of first particles gather towards the lower surface of the elastic packaging part, and the plurality of second particles gather towards the upper surface of the elastic packaging part;

the second state is a display state, the first electrode has the positive electrical property, and the second electrode has the negative electrical property; and in the second state, the plurality of first particles gather towards the upper surface of the elastic packaging part, and the plurality of second particles gather towards the lower surface of the elastic packaging part;

the third state is to stretch the flexible array substrate on the basis of the first state, and the elastic packaging part, the first electrode, and the second electrode are stretched; and in the third state, the plurality of first particles gather towards a position where the second electrode is located, and the plurality of second particles gather towards a position where the first electrode is located, so that the plurality of first particles cover a surface of the second electrode, and the plurality of second particles cover a surface of the first electrode; and the fourth state is to stretch the flexible array substrate on the basis of the second state, and the elastic packaging part, the first electrode, and the second electrode are stretched; and in the fourth state, the plurality of first particles gather towards the position where the first electrode is located, and the plurality of second particles gather towards the position where the second electrode is located, so that the plurality of first particles cover the surface of the first electrode, and the plurality of second particles cover the surface of the second electrode.

10. The flexible array substrate according to claim 1, wherein the light reflective material body comprises:

a plurality of cholesteric microcapsules, wherein a plurality of cholesteric liquid crystals are encapsulated in each of the plurality of cholesteric microcapsules, and the plurality of cholesteric microcapsules are of the same type or are divided into two different types;

wherein an upper surface of the elastic packaging part is provided with a first electrode, and a lower surface of the elastic packaging part is provided with a second electrode, and colors of the plurality of cholesteric liquid crystals encapsulated in each of the plurality of cholesteric microcapsules are the same as a color of an adjacent sub-pixel.

11. The flexible array substrate according to claim 10, wherein the first electrode is a transparent electrode, the second electrode is a light-absorbing electrode, and the first electrode and the second electrode are elastic electrodes; and the plurality of cholesteric microcapsules with two different types and located in the elastic packaging part share the same second electrode, and an electrical property of the first electrode is opposite to that of the second electrode.

12. The flexible array substrate according to claim 11, wherein the elastic packaging part has a fifth state, a sixth state, and a seventh state:

the fifth state is a non-display state, the first electrode and the second electrode do not provide a voltage; and in the fifth state, ambient light that reaches the plurality of cholesteric microcapsules from a light-emitting layer is absorbed by the plurality of cholesteric liquid crystals and is not reflected;

the sixth state is a display state, the first electrode and the second electrode respectively provide the voltage to the plurality of cholesteric liquid crystals; and in the sixth state, the ambient light that reaches the plurality of cholesteric microcapsules under the action of an electric field is reflected by the plurality of cholesteric liquid crystals, thereby resulting in color development; and the seventh state is to stretch the flexible array substrate on the basis of the sixth state, and the elastic packaging part, the first electrode, and the second electrode are stretched; and in the seventh state, the plurality of cholesteric liquid crystals gather towards a position where the first electrode is located, so that the plurality of cholesteric liquid crystals cover surfaces of the plurality of cholesteric microcapsules towards the first electrode.

13. A flexible display panel, comprising:

a flexible array substrate, comprising:

a plurality of pixel island areas sequentially arranged;

a plurality of flexible areas, wherein each of the plurality of flexible areas is disposed between adjacent two of the plurality of pixel island areas; and a plurality of isolation structures, wherein each of the plurality of isolation structures covers a corresponding one of the plurality of flexible areas, edges of each of the plurality of isolation structures extend out of the corresponding one of the plurality of flexible areas, and an upper surface of each of the plurality of isolation structures defines a groove;

wherein each of the plurality of flexible areas comprises:

an elastic packaging part disposed in the groove and comprising a light reflective material body;

the light reflective material body is configured for pixel compensation;

a light sensor, configured to detect intensity of light;

a light supplement component, connected to the flexible array substrate and configured for supplementing light to the flexible array substrate; and a controller, configured for controlling the light sensor and the light compensation component.

14. The flexible display panel according to claim 13, wherein each of the plurality of pixel island areas comprises:

a driving substrate;

a pixel definition layer disposed on the driving substrate, wherein the pixel definition layer protrudes from the driving substrate to form a pixel accommodation area;

a plurality of sub-pixels disposed in the pixel accommodation area, wherein each of the plurality of sub-pixels comprises an anode, a light-emitting layer, and a cathode stacked on each other, and two ends of the anode are at least partially wrapped by the pixel definition layer;

wherein a part of each of the plurality of isolation structures is disposed on a side of a corresponding pixel definition layer away from a corresponding driving substrate.

15. The flexible display panel according to claim 13, wherein each of the plurality of flexible areas further comprises:

an elastic substrate, disposed between adjacent driving substrates; and an opaque material layer, disposed on the elastic substrate and between adjacent pixel definition layers;

wherein a part of each of the plurality of isolation structures is disposed on a side of a corresponding opaque material layer away from a corresponding elastic substrate.

16. The flexible display panel according to claim 15, wherein, a material of the opaque material layer is the same as that of the pixel definition layer; and/or, the opaque material layer is an elastic opaque material layer.

17. The flexible display panel according to claim 13, wherein each of the plurality of isolation structures comprises a conductive metal layer and an isolation column sequentially stacked;

wherein the conductive metal layer covers a corresponding one of the plurality of flexible areas, and edges of the conductive metal layer extend out of the corresponding one of the plurality of flexible areas, and the isolation column is disposed on an upper surface of the conductive metal layer.

18. The flexible display panel according to claim 17, wherein each of the edges of each of the plurality of isolation structures extending out of the corresponding one of the plurality of flexible areas is an irregular shape; and a width of the elastic packaging part accounts for 40%-60% of a width of a corresponding one of the plurality of isolation structures.

19. The flexible display panel according to claim 13, wherein the light reflective material body comprises:

two-color electrophoretic particles, encapsulated in the elastic packaging part;

wherein the two-color electrophoretic particles comprise a plurality of first particles and a plurality of second particles; and an upper surface of the elastic packaging part is provided with a first electrode, and a lower surface of the elastic packaging part is provided with a second electrode.

20. The flexible display panel according to claim 19, wherein colors of the plurality of first particles are the same as a color of any sub-pixel adjacent to each of the plurality of isolation structures, and colors of the plurality of second particles are black;

the first electrode is a transparent electrode, and the second electrode is a light-absorbing electrode, the first electrode and the second electrode are elastic electrodes; and electrical properties of the plurality of first particles are opposite to that of the plurality of second particles; an electrical property of the first electrode is opposite to that of the second electrode.

* * * * *